US006916369B2

(12) United States Patent
Chun et al.

(10) Patent No.: US 6,916,369 B2
(45) Date of Patent: Jul. 12, 2005

(54) BENEFICIATED WATER REDUCING COMPOSITIONS

(75) Inventors: Byong-wa Chun, Newton, MA (US); Benita Dair, Silver Spring, MD (US); Charlotte B. Porteneuve, Boston, MA (US); Ara Avedis Jeknavorian, Chelmsford, MA (US); Josephine Ho-Wah Cheung, Waltham, MA (US); Lawrence R. Roberts, Acton, MA (US)

(73) Assignee: W. R. Grace & Co.-Conn., Columbia, MD (US)

( * ) Notice: Subject to any disclaimer, the term of this patent is extended or adjusted under 35 U.S.C. 154(b) by 0 days.

(21) Appl. No.: 10/384,823

(22) Filed: Mar. 10, 2003

(65) Prior Publication Data

US 2003/0172850 A1 Sep. 18, 2003

Related U.S. Application Data

(60) Provisional application No. 60/363,820, filed on Mar. 13, 2002.

(51) Int. Cl.$^7$ ............................ C04B 40/00; C04B 7/00; C04B 24/10; C08L 5/00; C13K 13/00
(52) U.S. Cl. ................. 106/823; 106/217.7; 106/156.2; 106/708; 106/726; 106/728; 106/810; 106/809; 106/808; 106/805; 106/795; 106/790; 106/748; 106/727; 106/725; 106/501.1; 106/205.71; 106/215.2; 106/218; 106/243; 127/37; 252/182.12; 524/320
(58) Field of Search ...................... 127/37; 252/182.12; 524/320; 106/819, 823, 217.7, 156.2, 708, 726, 728, 810, 808, 809, 795, 790, 748, 727, 725, 501.1, 205.71, 215.2, 218, 243

(56) References Cited

U.S. PATENT DOCUMENTS

| | | | |
|---|---|---|---|
| 3,776,740 A | 12/1973 | Sivertz et al. ................ 106/1 |
| 3,935,071 A | 1/1976 | Bergmeyer et al. .......... 195/32 |
| 3,969,395 A | 7/1976 | Dahlberg et al. .......... 260/484 |
| 4,108,891 A | 8/1978 | Hattori et al. ............. 260/528 |
| 4,210,455 A | 7/1980 | Metcalf et al. ............. 106/90 |
| 4,432,801 A | 2/1984 | Tegiacchi et al. ........... 106/92 |
| 4,466,834 A | 8/1984 | Dodson et al. ............. 106/89 |
| 4,843,173 A | 6/1989 | Saito et al. ................ 562/531 |
| 5,324,442 A | 6/1994 | Mathews .................... 252/70 |
| 5,620,877 A | 4/1997 | Farone et al. ............. 436/139 |
| 5,716,448 A * | 2/1998 | Furusawa et al. .......... 106/803 |
| 5,897,995 A | 4/1999 | Vroemen et al. .......... 435/137 |
| 6,110,271 A | 8/2000 | Skaggs et al. ............. 106/804 |

FOREIGN PATENT DOCUMENTS

| | | | | |
|---|---|---|---|---|
| DE | 4317488 A1 | 2/1994 | ............ | C12P/7/58 |
| EP | 0 228 274 B1 | 12/1986 | ............ | C12P/7/58 |
| EP | 0 228 274 A2 | 12/1986 | ............ | C12P/7/58 |

OTHER PUBLICATIONS

US 5,998,179, 12/1999, Lantero et al. (withdrawn)
Buchert, Biotechnical Laboratory, "Biotechnical oxidation of D–xylose and hemicellulose hydrolzates by *Gluconobacter oxydans*", Wspoo, Nov. (1990).

Boggs, Conversion of Spent Sulfite Liquor to a mixture of Aldonates and Lignosulfonates via the Cyanohydrin Synthesis, Pulp Manufacturers Research League, 50:6 Jun. 1967.
J. De Ley, Comparative Carbohydrate Metabolism and a Proposal for a Phylogenetic Relationship of the Acetic Acid Bacteria; J. gen. Icrobiol. 24:31–50 (1961), no month.
Jeffries, Utilization of Xylose by Bacteria, yeasts and Fungi, Advances in Biochemical Engineering/Biotechnology, (1983), no month.
Kiessling et al., Some Products of the Metabolism of D–Xylose by Pullularia pullulans, Acta Chem. Scand. 16:8, 1858–1862, (1962), no month.
Lawrence et al., The Microbial Oxidation of Pure Carbohydrate in the Presence of Calcium Lignosulfonate, Journal of the Federation of Sewage and Industrial Wastes Associations; 28:12, Dec. (1956), no month.
Schedel, 7 Regioselective Oxidation of Aminosorbitol with *Gluconobacter oxydans*, Key Reation in the Industrial 1–Deoxynojirimycin Synthesis, Chem. Biochem, Eng. Q 15 (3) 127–129 (2001), no month.
Production of D–Galactonic Acid, 2–Keto–D–Galastonic Acid, 2–Keto–D–Galastonic Acid, L–Arabonic Acid, and D–Xylonic Acid, Uchida et al. (1975). p. 257–262, no month.
Japanese Patent Abstract JP 60092240; Japanese Patent 60–92240 (1985), no month.
Japanese Patent Abstract JP 54128934; Japanese Patent 54–18934 (1979), no month.
Japanese Patent Abstract JP 61040854; Japanese Patent 61–40845 (1986), no month.
Japanese Patent Abstract JP 9040447; Japanese Patent 9–40447 (1997), no month.
Japanese Patent Abstract JP 60902704; Japanese Patent 6–92704 (1994), no month.
Japanese Patent Abstract JP 54162623.
Japanese Patent Abstract JP 57082157.
Japanese Patent Abstract JP 73006401.
J. Agric. Chem. 37(9) 514–517 *Studies on Xylonic Acid Fermentation (Part I)* (1963), no month.
Noka (J. Agric. Chem.), 20(11):559–565; Use of Corncobs (1): *Preparation of Xylose using Corncobs as the Starting Material* (Dec. 4, 1943).
Biochemische Zeitschrift, vol. 321, pp. 26–30 *Oxidations by Acetic Acid Bacteria* (1950), no month.

* cited by examiner

*Primary Examiner*—Elizabeth D. Wood
(74) *Attorney, Agent, or Firm*—Craig K. Leon; William L. Baker

(57) ABSTRACT

Exemplary compositions comprise at least one aldopentonic acid, such as xylonic acid; and further comprise a lignin, a lignosulfonic acid or its salt, an additional sugar acid such as a aldohexonic acid or salt, a conventional admixture (such as a polyacrylate superplasticizer, a corrosion inhibitor, a set retard, a set accelerator, etc.), or a mixture thereof. Exemplary methods for obtaining microbiologically or enzymatically converted sugar acids are also described herein.

21 Claims, 11 Drawing Sheets

Present Invention: SSL process
(a)

Present invention: HH process
(b)

BENEFICIATED WATER REDUCING COMPOSITIONS

This application claims the benefit of Provisional Application No. 60/363,820 filed Mar. 13, 2002.

FIELD OF THE INVENTION

The present invention relates to compositions for modifying hydratable cementitious materials, and more particularly to compositions containing an aldopentonic acid or salt thereof, and optionally comprising a lignosulfonate, an aldohexonic acid or its salt, or mixtures thereof, and processes for making these compositions.

BACKGROUND OF THE INVENTION

Various additives have been known to increase flowability (otherwise termed "slump") in cementitious compositions, such as mortar and concrete, without increasing the water content of the initially formed composition. Such additives, or "admixtures" as they are also called, are classified as "water reducers" or "superplasticizers" when used for this purpose. One of the most commonly used of these water reducers are lignin-sulfonate compounds, also called "lignosulfonates," obtained from sulfite pulping processes wherein cellulose is extracted from wood.

The so-called sulfite pulping process involves mixing sulfur dioxide ($SO_2$) with an aqueous solution of base to generate the raw liquor for cooking the wood. In water, the sulfur dioxide forms sulfurous acid ($SO_2+H_2O \longleftrightarrow H_2SO_3$) which degrades and eventually sulfonates the lignin by replacing a hydroxyl group with a sulfonate group, allowing it to be solubilized and separated from the cellulose in non-precipitated form. The result is called "spent sulfite liquor" (SSL) and contains lignosulfonate and sugars, primarily monosaccharides, that need to be removed or destroyed so as to permit the lignosulfonate to be used effectively as a water-reducing concrete additive. Otherwise, high sugar levels accompanying the lignosulfonate can significantly retard the setting of the concrete to the point at which substantial delay of initial set time outweighs the water reduction advantage. If not removed, sugars are usually destroyed (e.g., through degradation, decomposition, etc.) and confer no appreciable benefit to the operation of lignosulfonate in concrete.

One of the objectives of the present invention is to provide compositions containing a lignin and/or lignosulfonate by converting, into useful acid or salt form, the aldose sugars that are present in agricultural residues (e.g., plant, tree, and other cellulose-containing materials). The present inventors believe that aldonic acids have excellent cement dispersing capabilities, and can therefore "beneficiate" the function of lignosulfonates, in particular, as water reducing additives.

Another objective of the present invention is to avoid, during recovery of lignin or lignosulfonate from agricultural materials, the very step of removing or destroying sugars and the attendant expense. Removed sugars are used as sweeteners. The sugars are typically removed by yeast. Sugars are otherwise destroyed through alkaline oxidation into small organic acids and carbon dioxide and water. Instead of removing or destroying the sugars, however, the present inventors propose to convert them, using enzymatic or microbiological means that are environmentally friendly and efficient. The sugars in the crude lignosulfonates can be aldoses, such as pentose and hexose.

Another and no less significant objective of the present invention is to convert aldopentose sugars into compositions that are rich in aldopentonic acids (or their salts), and, in particular, compositions that are rich in xylonic acid. Other exemplary compositions further comprise an aldohexonic acid or its salt (e.g., gluconic acid/gluconate). The present inventors surprisingly discovered that xylonic acid (or its salt form), which may be obtained through oxidation of xylose sugar, provides lower set retardation than gluconic acid or gluconates, which previously were known as water reducers in the concrete industry, at equal dosage levels. A preferred composition of the invention comprises a converted sugar in a ratio (aldopentonic acid/salt to aldohexonic acid/salt by weight) of 20:1 to 1:10.

A still further objective of the present invention is to provide a process that, while producing aldonic acid-beneficiated lignosulfonate-containing compositions, can be used for adding sugars from other sources (e.g., corn syrup, molasses), so that these can be converted as well into useful byproducts for modifying one or more properties of a hydratable cementitious material.

SUMMARY OF THE INVENTION

In surmounting the disadvantages of the prior art, the present invention provides compositions for modifying one or more properties of hydratable cementitious materials, and discloses processes for making such compositions.

An exemplary composition of the invention comprises: (A) a lignosulfonic acid or salt thereof; an aldohexonic acid or salt thereof; an hexuronic acid or salt thereof; an hexaric acid or salt thereof; or mixture thereof; and (B) at least one aldopentonic acid or salt thereof Another exemplary composition comprises: a lignosulfonic acid or its salt (e.g., a lignosulfonate); and at least one aldopentonic acid (e.g., xylonic acid) or salt thereof, and optionally an aldohexonic acid (e.g., gluconic acid) or salt thereof.

Exemplary processes of the invention for making such a composition involve subjecting agricultural residues—such as corn fibers (such as cobs, stalks, and/or husks), bagasse, straw, bamboo, rice hulls, wheat chaff, hard wood chips, hard wood sawdust, newsprint or recycled paper, or a mixture thereof—to microbially or enzymatically oxidative processes. The products of oxidation provide water-reducing compositions for use in cementitious materials, such as concrete, while avoiding excessive retardation. This is because the preferred process for obtaining such byproducts does not destroy aldose sugars or remove them from agricultural residues, but instead allows them to be processed in situ with lignin and/or other biomass sources of aldose sugar(as provided in hemicellulose hydrolysate liquors) and/or lignosulfonate (as provided in spent sulfite liquor).

In further exemplary embodiments, higher yields of desired aldonic acid byproducts may be increased by optionally introducing additional aldose sugars (e.g., corn syrup, molasses from external sources) into the oxidative processing of the agricultural residues. Accordingly, an exemplary process of the invention comprises introducing a microorganism or enzyme which is operative to convert aldose sugars into aldonic acids or salts, into (A) a hemicellulose hydrolysate (HH) liquor comprising primarily at least one aldose or aldourose, preferably including at least one aldopentose sugar; (B) a spent sulfite liquor (SSL) comprising a lignosulfonate and at least one aldose sugar (e.g., preferably an aldopentose sugar); or (C) a liquor mixture of (A) and (B); and obtaining at least one aldonic acid or salt thereof. The present invention is thus further directed to compositions (e.g., lignosulfonic acids or salts in combination with aldonic acids, such as gluconic acid, xylonic acid, their salts, or mixtures thereof) produced through such processes.

Further exemplary processes further comprise introducing said sulfite process liquor, after conversion of aldose sugars into aldonic acids, into a hydratable cementitious composition.

The present inventors surprisingly discovered that xylonic acid provides useful water reducing ability in hydratable cementitious materials but, at certain dosage levels, without the disadvantageous set retarding quality of gluconates. Xylonic acid and its derivatives have a further advantage in that they do not give rise to air entrainment problems. No widespread or economically advantageous process is commercialized at present for producing xylonic acid. However, the present inventors realize that certain agricultural residues, such as corn stover, can provide a large xylose source for oxidative conversion into xylonic acid, and these particular agricultural residues have little or no lignin content.

Thus, the present invention is also directed to compositions comprising xylonic acid and optionally other conventional admixtures, such as water reducers (e.g., lignosulfonate), superplasticizers (e.g., polycarboxylate-type), water repellent agents, corrosion inhibiting agents, shrinkage cracking agents, and others.

In further exemplary compositions of the invention, the pentose sugar component is predominantly xylonic acid or its salt, and thus exceeds in amount arabinonic acid or its salt (if any). Thus, in such further exemplary compositions the amount of xylonic acid/salt to arabinonic acid/salt is preferably in the ratio of 1:0 to 1:1. Further advantages and features of the invention are described hereinafter.

DETAILED DESCRIPTION OF EXEMPLARY EMBODIMENTS

A first exemplary composition of the invention comprises a lignosulfonate and at least one aldopentonic acid or salt, and optionally at least one aldohexonic acid or salt, which composition is useful for modifying a hydratable cementitious material. The initial portion of this detailed description section focuses on lignin-based processes, whereby a lignosulfonate appears in the resultant composition. Lignin is the characteristic binding constituent between the cell walls of cellulosic materials, such as trees and plants, and provides an appropriate starting point for present purposes. However, in latter portions of this detailed description section, the present inventors focus on processes whereby substantially pure aldopentonic acidlsalts (without lignin or lignosulfonate) can be produced using processes of the invention, and can be used to make custom blended additives and admixtures for modifying cements and concretes.

A lignocellulosic biomass is subjected to acid hydrolysis in a digester to render a nonsoluble portion, such as cellulose, which can be separated for making paper products such as paper, and a soluble portion which is the hydrolysate liquor that contains lignin and hemicellulose. Hemicellulose contains sugars and sugar polymers, e.g., monosaccharides, oligosaccharides, and polysaccharides. In lignosulfonate production, the process is similar except that the hydrolysate is cooked at a high temperature with sulfite such that the lignin is sulfonated (thereby producing lignosulfonate) and the hemicelluloses are decomposed to monosaccharides.

Figure 1:
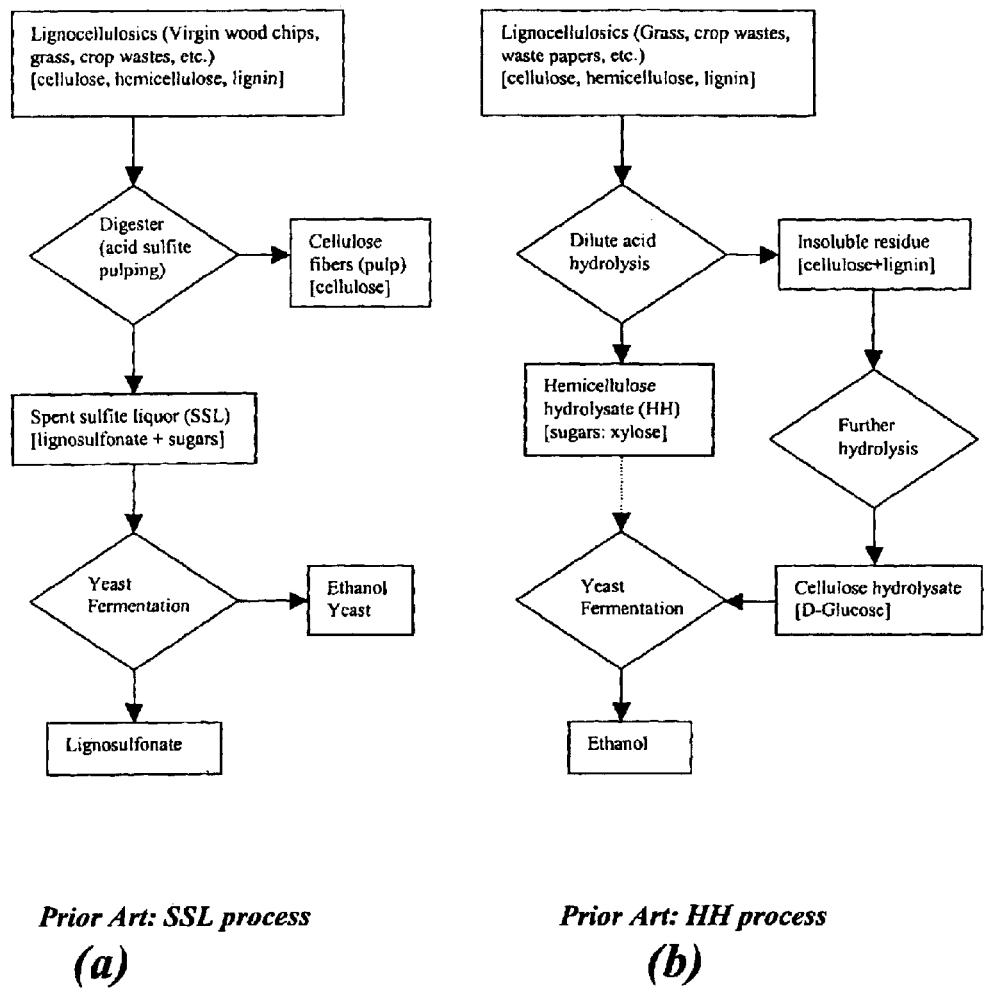
FIG. 1(a) is a flow chart illustrating a PRIOR ART process for making lignosulfonates from cellulosic materials.
FIG. 1(b) is a flow chart illustrating a PRIOR ART process for making hemicellulose hydrolysate products such as ethanol.

FIGS. 1(a) and 1(b) illustrate prior art processes for converting lignocellulosic materials (e.g., wood, grass, crop wastes, waste paper) into useful products. FIG. 1(a) illustrates the prior art acid sulfite pulping process, and FIG. 1(b) illustrates a prior art process employing dilute acid hydrolysis. In both processes, typically the sugar byproducts are fermented into ethanol by yeast, or they are separated and processed into sweetener products (for human or animal consumption).

In the process of FIG. 1(a), wood and other lignocellulosic materials are processed in a digester that contains acid sulfite. The insoluble material of such a process contains cellulosic fibers that are removed and used for making paper and paper products; while the soluble portion contains sulfonated lignin (lignosulfonate) and monosaccharides.

Figure 2:
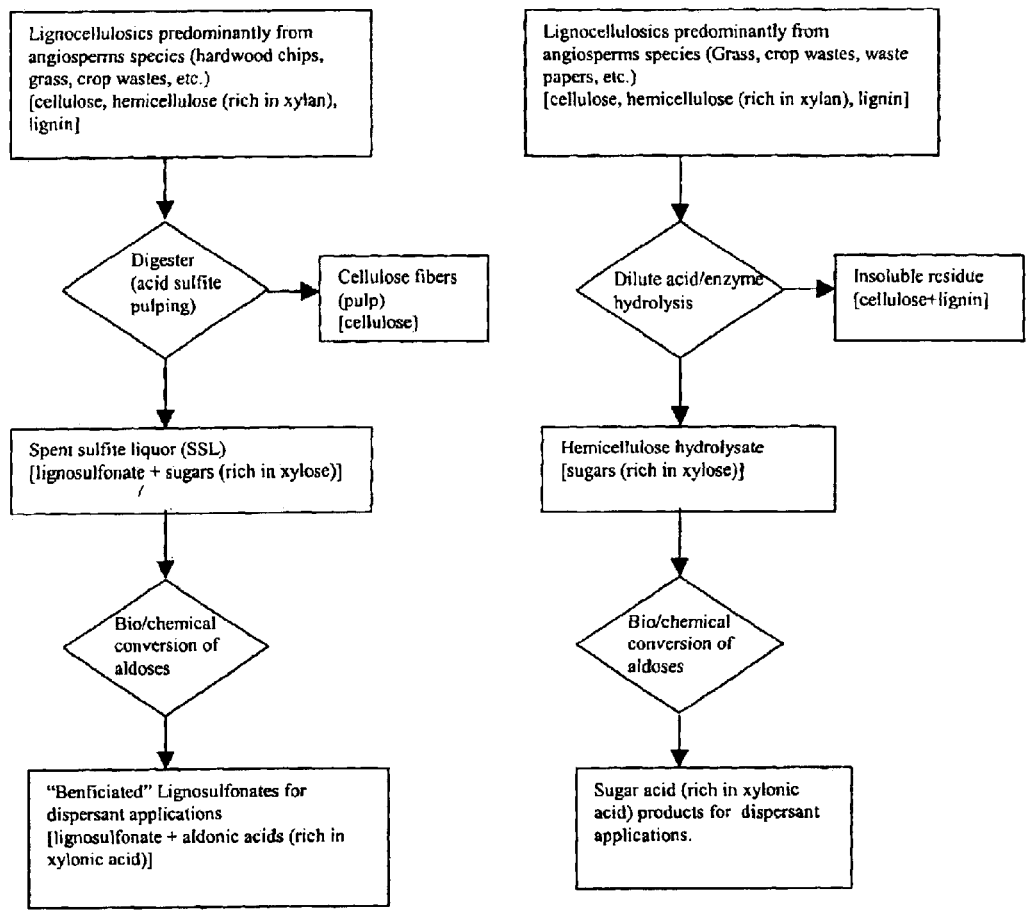
FIG. 2(a) is a flow chart illustrating an exemplary process of the present invention for making sugar acid products useful for modifying hydratable cementitious materials.
FIG. 2(b) is a flow chart illustrating another exemplary process of the present invention for making sugar acid products useful for modifying hydratable cementitious materials.

In exemplary processes of the present invention, however, as illustrated in FIG. 2(a), the inventors propose to avoid removing or destroying aldose sugars contained in agricultural residues by allowing them instead to be processed in situ with the lignosulfonate to convert the aldoses into aldonic acids. The resulting aldonic acids, by themselves or in combination with lignosulfonate, are found by the present inventors to provide water reducing abilities when incorporated into hydratable cementitious compositions.

As mentioned above, FIG. 1(b) illustrates prior art processes wherein lignocellulosic materials (cellulose, hemicellulose) are converted by dilute acid hydrolysis into hemicellulose hydrolysate which contains sugars, and this hydrolysate is usually fermented to provide ethanol. Hemicellulose, a polysaccharide, is the non-cellulosic component of plant fibers. One type of hemicellulose is xylan, which is a polymer of predominantly D-xylose and a small amount of other sugars and sugar acids. Dilute acid hydrolysis of the lignocellulosic materials and subsequent removal of the insoluble cellulose and lignin leaves the soluble hemicellulose hydrolysate, which contains predominantly monomers (and oligomers) of the D-xylose and other sugars (as well as some various aromatic compounds from the lignin). Typically, the hemicellulose hydrolysate is fermented, using yeast or microbes, to obtain ethanol (See FIG. 1(b), bottom).

In the present invention, an exemplary method of which is illustrated in FIG. 2(b), the present inventors propose to employ the hemicellulose hydrolysate, especially when extracted from angiosperm species and hardwoods, as a precursor for bio-converting aldose sugar content into aldonic acids (or their salts), especially aldopentonic acids or salts, which provide reducing capabilities when used in hydratable cementitious materials such as concrete and mortar.

An exemplary process of the present invention comprises introducing a microorganism or enzyme, which is operative to convert aldopentose sugars into aldonic acids or salts, into (A) a hemicellulose hydrolysate liquor comprising a lignin and at least one aldopentose sugar; (B) a spent sulfite liquor comprising a lignosulfonate and at least one aldopentose sugar; (C) or a liquor mixture of (A) and (B), and, after conversion of aldopentose sugar(s), obtaining at least one aldonic acid or salt thereof.

In order to obtain a composition that is rich in aldopentose sugars that can be converted into aldopentonic acids or salts, such as xylonic acid, the hemicellulose hydrolysate liquor and/or spent sulfite liquor must be derived from "agricultural residue" materials that have high aldopentose content or their precursors.

Preferred "agricultural residues" useful in processes of the present invention therefore include selected plant and tree materials and byproducts, including, without limitation: corn milling waste (such as corn stalks, corn husks, corn cobs, corn steep liquor); bagasse (sugar cane or grape residues); rice hulls; wheat chaff (debris separated from the seed); grasses (e.g., alfalfa, esparto grass, napier grass, etc.); cereal straws; sorghum; hardwood (e.g., birch, maple, eucalyptus, etc.); bamboo; recycled newsprint or other brown papers having at least a 1 to 100% hardwood content by weight.

Other exemplary agricultural residues useful in the present invention should be preferably chosen such that substantially little or no lignin or lignosulfonate is present in the byproduct after acid hydrolysis. For example, corn stover is believed to be rich in aldopentonic sugar (xylose) but has little or no lignin content. Another preferred agricultural residue is sugar cane, which is believed to have little or no lignin.

Aldose sugars in such agricultural residue materials can be converted microbiologically or enzymatically to organic acids, sugar alcohols, or solvents (e.g., ethanol). Aldonic acids are sugar acids formed by oxidation of aldoses. In the literature, production of aldonic acids from aldoses through oxidative metabolism, may be achieved using microorganisms such as *Gluconobacter*, *Pseudomonas*, and *Acetobacter*, for example. These and others have been remarked in the literature:

*Acetobacter sp.* (Bernhauer, K. and Riedl-Tumova, E. (1950), Biochem. Z. 321, pp. 26–30).

*Aspergillis* (noted in U.S. Pat. No. 5,620,877 of Farone).

*Aureobasidium pullulans* (noted in German Patent 4317488 of Anastassiadis).

*Clostridium sp.* (noted in U.S. Pat. No. 5,620,877 of Farone).

*Enterobacter cloacea* (Ishizaki, H., Ihara, T., and Yoshitake, J. 1973), Nippon Nogei Kagaku Kaishi 47, pp. 755–761.

*Erwinia sp.* (Suzuki et al., Agric. Biol. Chem. 29 (1965), pp. 462–470; Uchida et al., Nippon Nogei Kagaku Kaishi 49 (1975), pp. 257–262).

*Fusarium lini* (Hayasida et al., Biochem. Z. 298 (1938), pp. 169–178); *Micrococcus sp.* (Ohsugi et al., Agric. Biol. Chem. 34 (1970), pp. 357–363).

*Gluconobacter Oxydans* (Buchert, J., "Biotechnical Oxidation of D-xylose and Hemicellulose Hydrolyzates by *Gluconobacter Oxydans*," Technical Research Centre of Finland, Publications 70 (Espoo, November 1990), pp. 17–20).

*Lactobacillis* (noted in U.S. Pat. No. 5,620,877 of Farone).

*Micrococcus sp.* (Ohsugi et al., "Oxidative Dissimilation by *Micrococcus sp.* Of D-xylose into D-xylonic Acid")

*Penicillium corylophilum* (Ikeda et al., Nippon Nogei Kagaku Kaishi 39 (1963), pp. 514–517);

*Pichia quercuum* (Suzuki et al., Appl. Microbiol. 25 (1973), pp. 850–852);

*Propioni bacteria* (noted in U.S. Pat. No. 5,620,877 of Farone);

*Pseudomonas sp.* (Lockwood et al., G. E. N. J. Bacteriol. 52 (1946), pp. 581–586; See also Yokosawa et al., Nippon Nogei Kagaku Kaishi 26 (1952), pp. 415–420);

*Pseudomonas fragi* (J. Buchert et al., "Production of Xylonic Acid by *Psuedomonas Fragi*," Biotechnology Letters, Vol. 8, No. 8 (1986), pp. 541–546.).

*Pullularia pullulans* (Kiessling et al., Acta Chem. Scand. 16 (1962), pp. 1858–1862); Sasaki et al., J. Ferment. Technol. 48 (1970), pp. 368–373).

*Zymomonas mobilis* (noted in U.S. Pat. No. 5,620,877 of Farone);

This foregoing list is not intended to be exhaustive. Preferred microorganisms for oxidative digestion of aldoses include *Gluconobacter oxydans*, *Pseudomonas fragi*, and *Pullularia pullulans*.

Alternatively, production of aldonic acids from aldoses through enzymatic conversion may be achieved using aldose oxidase enzymes, such as, for example glucose oxidase (EC 1.1.1.118; EC 1.1.1.119; EC 1.1.1.47; EC 1.1.3.4; EC 1.199.10; EC 1.1.99.17); xylose oxidase (EC 1.1.1.175; EC 1.1.1.179; EC 1.1.3.5); or aldose oxidase (EC 1.1.1.121).

Compositions useful for modifying one or more properties of hydratable cementitious compositions thus comprise at least one aldopentonic acid or salt derived from an aldopentose (e.g., xylose, arabinose) and, optionally, an aldohexose (e.g., glucose, galactose, mannose). The preferred aldopentonic acid/salt is xylonic acid. The oxidation can be accomplished by combining one of the aforementioned microorganisms and aldose into an aqueous suspension, optionally but preferably supplemented by molasses, corn syrup, or glucose, to provide fuel for the oxidative metabolism as may be required by the microorganism, and/or by combining the aldose and one or more oxidase enzymes into an aqueous suspension.

A sample description of methods for converting glucose into gluconic acid via enzyme may be found in U.S. Pat. No. 5,897,995 of Vroemen et al.; while methods of glucose conversion via microbial activity may be found in German Patent No. DE 4317488 of Anastassiadis et al., all of which are incorporated herein by reference. Methods of xylose conversion through microbial activity using pure xylose and in hemicellulose hydrolysates may be found in Buchert, J., "Biotechnical Oxidation of D-xylose and Hemicellulose Hydrolyzates by Gluconobacter Oxydans," Technical Research Centre of Finland, Publications 70 (Espoo, November 1990), also incorporated herein by reference.

Preferably, the microbial oxidation is accomplished by introducing at least one of the microorganisms as described above into a sulfite process liquor that has been separated from cellulose as a result of the sulfite pulp mill processing of agricultural residue such as hard wood. The sulfite process liquor thus contains monosaccharides and lignosulfonate. Instead of removing the monosaccharides, however, the present inventors believe that the sulfite process liquor can be used as a source for aldose sugars that can be microbially oxidized into aldonic acids and incorporated directly into a hydratable cementitious composition as a water-reducing additive (thereby "beneficiating" the process liquor by avoiding the excessive set retarding properties of otherwise unconverted sugars). The sulfite process liquor may also be supplemented further with additional aldoses or aldonic acids to further beneficiate the process liquor.

Thus, an exemplary process of the invention comprises introducing, into a sulfite process liquor derived from pulp milling of hardwood and containing aldose sugars inherent in the sulfite process liquor and/or supplemented aldose sugars, a microorganism or enzyme operative to metabolize the aldose sugars into aldonic acids. Optionally, softwood can be incorporated along with the hardwood.

Accordingly, an exemplary composition for modifying one or more properties of hydratable cementitious materials, comprises (A) a lignosulfonic acid or salt thereof; an aldohexonic acid or salt thereof; an hexouronic acid or salt thereof; an hexaric acids salt thereof; or mixture thereof; (B) at least one aldopentonic acid or its salt. Preferably, the component (A) is present in an amount of 5–90%, more preferably 5–70% (the percentages herein being based on dry weight solids in the composition). For example, an exemplary composition comprises a lignosulfonic acid or salt; an aldopentonic acid or its salt; and optionally an aldohexonic acid or its salt.

In another exemplary process, a sugar source such as glucose, corn syrup, and molasses may be incorporated into the HH or SSL liquor before conversion of aldopentose sugars. This may be done, for example, to provide further sugar acid byproducts and/or to provide metabolic fuel for the microorganism. For example, glucose may be incorporated into the HH liquor, the SSL liquor, or into a xylose broth (for agricultural wastes such as corn stover which do not have lignin) to facilitate bio-conversion of the aldopentose into aldonic acids/salts, because certain microorganisms require glucose for metabolic support. In "Biotechnical Oxidation of D-xylose and Hemicellulose Hydrolyzates by *Gluconobacter Oxydans*," Technical Research Centre of Finland, Publications 70 (Espoo, November 1990), Buchert noted that *Gluconobacter oxydans* sub *oxydans* required 5% glucose added to xylose for metabolic support. Accordingly, the present inventors believe that combinations of aldopentose and aldohexose sugars may provide better oxidative environments for microbial conversion in some cases.

Further exemplary compositions may comprise an alcohol, such as methanol and ethanol, preferably in an amount of 0–5%, and more preferably 0.01–2.0% based on dry weight of solids in the composition.

Still further exemplary compositions may comprise cellulosic fibers in an amount of 0–50%, and more preferably 0.01–2.0% based on dry weight of solids in the composition.

The aldopentonic acid or salt of component (B) may comprise arabinonic, xylonic acid, or mixture thereof, but preferably xylonic acid. As mentioned above, xylonic acid is preferably present in the composition in the amount of at least 10%, more preferably at least 30%, and most preferably at least 50% based on dry weight solids. Further compositions comprise at least one aldohexonic acid, which may be gluconic acid, mannonic acid, galactonic acid, their salts, or mixtures thereof.

Exemplary cementitious compositions of the invention have at least one hydratable cementitious binder and at least one aldopentonic acid, such as xylonic acid or its salt, optionally with a lignosulfonic acid or its salt, an aldohexonic acid or its salt, or mixture thereof. Such cementitious binder-containing composition may further comprise fine and/or coarse aggregate. The present invention also provides a method for modifying a hydratable cementitious composition by introducing at least one aldopentonic acid or salt to the cementitious binder, such as during an intergrinding operation whereby the clinker is being ground to obtain a hydratable cement; or such as by combining the aldopentonic acid or salt with a hydratable cement binder before, during, or after water is added to hydrate the cementitious binder.

The present invention also provides hydratable cementitious materials having the aforementioned lignosulfonic acid or salt with at least one aldopentonic acid or salt thereof. The terms "cement" and "cementitious composition" (which may be synonymous with "cement composition") may be used herein to refer to dry powders as well as to pastes, mortars, shotcrete, grouts such as oil well cementing grouts, and concrete compositions comprising a hydratable cement binder. The terms "paste", "mortar" and "concrete" are terms of art: pastes are mixtures composed of a hydratable cement binder (usually, but not exclusively, Portland cement, plaster, masonry cement, or mortar cement and may also include limestone, hydrated lime, fly ash, granulated blast furnace slag, pozzolans, silica fume, metakaolin, or other materials commonly included in such cements) and water; mortars are pastes additionally including fine aggregate (e.g., sand), and concrete are mortars additionally including coarse aggregate (e.g., crushed gravel, stone).

Cementitious compositions of the present invention may be formed by mixing required amounts of certain materials, e.g., a hydratable cement, water, and optionally a fine aggregate (e.g., sand), coarse aggregate (e.g., crushed stone or gravel), or mixture of both fine and coarse aggregates, as may be applicable to make the particular cement composition being formed.

As previously mentioned, the inventors realize that substantially pure xylose can be obtained from corn stover without substantial lignin content and which can be subjected to oxidative degradation through microbial and/or enzymatic conversion. With their discovery that xylonic acid provides advantages as a water reducing additive for cementitious materials with less retardation than gluconic acid at equal dosage levels, and within the context of the fact that there are no commercial processes for producing xylonic acid on a economic or widespread scale, the present invention also provides additive and admixture compositions (for use in cementitious materials) comprising predominantly xylonic acid (or salt), and optionally at least one other component that could be added with the xylose before, during, or after it is converted into xylonic acid.

An exemplary composition therefore comprises xylonic acid in an amount of 10–100% by dry weight solids, optionally one or more materials selected from a lignosulfonate, an aldohexonic acid (e.g., gluconic acid) or salt thereof, or conventional cement additives and admixtures. Such additives or admixtures may include, for example, a polycarboxylate type superplasticizer; triethanolamine, triisopropanolamine, an alkali or alkaline earth metal salt (e.g., calcium nitrite, calcium nitrate), or other admixtures, to achieve potentially synergistic benefits.

Accordingly, another exemplary process of the invention comprises introducing a microorganism or enzyme, which is operative to convert aldopentose sugars into aldonic acids or salts, into a byproduct material obtained by acid hydrolysis of an agricultural residue not containing substantial amounts of lignin (e.g., corn stover, corn cob), and obtaining an aldopentonic acid or derivative (e.g., xylonic acid or salt) having substantially no lignin or lignosulfonate. Consequently, the present inventors believe that substantially pure xylonic acid can be obtained and used, for example, as a water reducing additive or admixture for cementitious materials. This process can be modified by combining sugars from other sources (e.g., corn syrup, molasses, glucose) to obtain customized blends of byproducts before or after the oxidation of the sugars.

The aldonic acid may be combined with other additives or after the conversion of sugars into the sugar acid. Such other additive may, for example, include one or more of the following materials: molasses, melamine sulfonate formaldehyde polymer, naphthalene sulfonate formaldehyde polymer, alkali or alkaline earth chloride, bromide, protein, alkanolamine, tall oil fatty acid, fatty acid or derivative thereof, fatty ester or derivative thereof, alkali or alkaline earth hydroxycarboxylic acid salt of gluconic acid, glucoheptonic acid, citric acid, tartaric acid, mucic acid, malic acid, salicylic acid, lignosulfonic acid, dye, sucrose, glucose, corn syrup, sodium sarcosinate, alcohol, phenol, acetic acid, sodium hydroxide, potassium hydroxide, sodium linear alkylate sulfonate, formaldehyde, silica, diglycinate, polymers containing oxyalkylene groups, calcium formate, formic acid, siloxane, a surfactant, resin and rosin acids, polyacrylic acid, polyvinyl pyrrolidone, aluminate, silicate, carbonate, borate, phosphonate, lactate, sulfate, thiosulfate, benzoate, acetate, oxalate, ferricyanide, and succinate, glycols, borate ester, phosphonate ester, phosphate ester, phenol and derivative thereof, a natural gum, a starch, or derivatives (e.g., salts) of any of the foregoing. Alternatively the aldose sugar and above-mentioned additive may be combined and the aldose sugar subsequently oxidized by the procedures of this invention, provided that the additive is not more easily oxidized than the aldose sugar.

Compositions of the invention comprising xylonic acid or its salt form may further comprise at least one admixture, such as a set accelerator, retarder, air detrainer, air entrainer, alkali-reactivity reducer, bonding admixture, water-reducing admixture, superplasticizer), colorant, corrosion inhibitor, a damp proofing admixture, gas former, permeability reducer, pumping aid, fungicidal admixture, germicidal admixture, insecticidal admixture, or a mixture thereof. The foregoing admixtures are generally known in the art and described, for example, in World Patent Application No. PCT/US98/17441 of W. R. Grace & Co.-Conn., incorporated herein by reference).

Polycarboxylic acid type superplasticizers are conventionally known in the concrete arts. Exemplary polycarboxylic acid/salt type superplasticizers which are contemplated for use in combination with the aldopentonic acid/salt compositions of the invention include so-called "EO/PO type comb polymers," a term which means and refers to a polymer having a backbone such as a carbon backbone to which are attached both carboxylate groups (which are believed to function as cement anchoring groups in the cementitious mixture) and ethylene oxide (EO) groups, propylene oxide (PO) groups, and/or a combination of EO/PO groups in the backbone of the comb polymer or, more preferably, in pendant groups attached to the backbone. The pendant groups may be ionic or non-ionic. Examples of EO/PO type comb polymer superplasticizers and water reducers are discussed or described in U.S. Pat. No. 6,352,952 of Jardine et al., U.S. Pat. No. 5,393,343 of Darwin et al.; as well as in U.S. Pat. Nos. 4,946,904; 4,471,100; 5,100,984; and 5,369,198 which describe comb polymers which are for example copolymers of polycarboxylic monomers such as maleic acid or anhydride and polymerizable EO/PO-containing monomers such as polyalkylene glycol monoallyl ethers, etc.

A further exemplary composition of the invention comprises at least one aldopentonic acid or salt, such as xylonic acid, and at least one oxyalkylene-group-containing compound, preferably a polyoxylakylene compound having repeating ethylene oxide (EO) groups, polyethylene oxide (PO) groups, or a mixture thereof. Such oxyalkylene group containing compounds, if further having cement-anchoring groups such as carboxylate moieties, can function as superplasticizers or water reducers, as described above. Such oxyalkylene-group-containing compounds may also function as air entraining agents and/or shrinkage reduction agents. Examples of oxyalkylene type shrinkage reduction agents are disclosed, for example, in U.S. Pat. Nos. 5,556,460 and 5,938,835, which are incorporated herein by reference.

Further exemplary compositions of the invention comprise at least one aldopentonic acid or salt, such as xylonic acid, in combination with at least two oxyalkylene group containing compositions, such as a first group which is operative to fluidify a cementitious composition, and a second group which is operative to reduce shrinkage or shrinkage cracking in hydratable cementitious compositions.

Another exemplary composition of the invention comprises at least one aldopentonic acid or salt, such as xylonic acid or salt thereof, in combination with an alkanolamine additive (or admixture), including but not limited to triethanolamine (TEA); methyl(diethanol)amine: diethanolisopropanolamine (DEIPA); triisopropanolamine (TIPA); tetra hydroxyethyl ethylene diamine (THEED); and other alkanolamines. The xylonic acid or its salt ("XA") may be used in an XA:alkanolamine additive ratio of 100:1 to 1:1 and more preferably 2:1 to 10:1. For example, the alkanolamine may be N,N-bis(2-hydroxyethyl)-2-propanolamine or N,N-bis(2-hydroxypropyl)-N-(hydroxyethyl) amine. An exemplary cementitious composition of the invention thus would comprise a hydratable cementitious binder and the XA/alkanolamine additive combination wherein the amount of the XA present is 0.005 to 0.5% by dry weight based on weight of the cementitious binder.

Another exemplary composition of the invention comprises at least one aldopentonic acid or salt, such as xylonic acid or salt thereof, in combination with an amine additive (or admixture) having at least one hydroxyl group and/or ionic group, including but not limited to sarcosine and glycine. The xylonic acid or its salt ("XA") may be used in an XA:amine additive ratio of 100:1 to 1:1 and more preferably 10:1 to 3:1. An exemplary cementitious composition of the invention thus would comprise a hydratable cementitious binder and the XA/additive combination wherein the amount of XA present is 0.005 to 0.5% by dry weight based on weight of the cementitious binder.

Another exemplary composition of the invention comprises at least one aldopentonic acid or salt, such as xylonic acid or salt thereof, in combination with an additive (or admixture) selected from the group consisting of an alkali or alkaline earth hydroxycarboxylic acid salt of gluconic acid, glucoheptonic acid, citric acid, tartaric acid, mucic acid, malic acid, and salicylic acid. The xylonic acid or its salt ("XA") may be used in an XA:additive ratio of 1:99 to 99:1 and more preferably 3:10 to 10:3. An exemplary cementitious composition of the invention thus would comprise a hydratable cementitious binder and the XA:additive combination wherein the amount of XA is 0.005 to 0.5% by dry weight based on weight of the cementitious binder.

Another exemplary composition of the invention comprises at least one aldopentonic acid or salt, such as xylonic acid or salt thereof, in combination with an additive (or admixture) selected from the group consisting of an alkali, alkaline earth, Group III, or transition metal choride and/or bromide. The xylonic acid or its salt may ("XA") be used in a XA:additive ratio of 1:20 to 500:1 and more preferably 1:5 to 10:1. An exemplary cementitious composition of the invention thus would comprise a hydratable cementitious binder and the XA:additive combination wherein the amount of the XA present is 0.005 to 0.5% by dry weight based on weight of the cementitious binder.

Another exemplary composition of the invention comprises at least one aldopentonic acid or salt, such as xylonic acid or salt thereof, in combination with an additive (or admixture) selected from the group consisting of an alkali, alkaline earth, Group III, or transition metal salt (or acid or derivative thereof) of an aluminate, silicate, carbonate, borate, phosphonate, lactate, sulfate, thiosulfate, benzoate, acetate, oxalate, ferricyanide, succinate, or mixture thereof. The xylonic acid or its salt ("XA") may be used in a XA:additive ratio of 1:100 to 100:1 and more preferably 1:20 to 20:1. An exemplary cementitious composition of the invention thus would comprise a hydratable cementitious binder and the XA:additive combination wherein the amount of XA being present is 0.005 to 0.5% by dry weight based on weight of the cementitious binder.

In a further exemplary composition of the invention, the at least one aldopentonic acid or salt, such as xylonic acid or salt thereof, may be combined with at least one other additive (or admixture) selected from the group consisting of a glycol (e.g., polyethylene glycol), a glycerol, borate ester, phosphonate ester, phosphate ester, a phenol or phenolic derivative, a natural gum, a starch-derived compound, a hydrocolloid, or a mixture thereof. The xylonic acid or its salt ("XA") may be used in a XA:additive ratio of 500:1 to 1:1 and more preferably 10:1 to 2:1. An exemplary cementitious composition of the invention thus would comprise a hydratable cementitious binder and the XA/additive wherein the amount of the xylonic acid or its salt being present is 0.005 to 0.5% by dry weight based on weight of the cementitious binder.

In a further exemplary composition of the invention, the at least one aldopentonic acid or salt, such as xylonic acid or salt thereof, may be combined with at least one other additive (or admixture) selected from the group consisting of a waterproofing agent (e.g., calcium stearate); a finishing aid (e.g., polyether); an anti-freeze agent (e.g., Ca nitrate or Ca nitrite); a viscosity modifying agent (e.g., biopolymer S-657 or diutan gum, welan gum); a shrinkage reducing agent (e.g., oxyalkylene type); a strength enhancing agent (e.g., chloride thiocyanate, alkanolamine); an anti-efflorescent agent (e.g., calcium stearate, calcium stearate dispersion); an expansive agent (e.g., calcium aluminates); and de-icing agent (e.g., chloride salts, glycol).

The aldopentonic acid-containing compositions and beneficiated lignosulfonate compositions of the invention, in addition to providing excellent performance as cement additives and concrete admixtures, are believed to have potential other applications. Such compositions are believed to have advantages, such as dispersants or fluidity modifiers, when used as additives in: oil well drilling muds; pesticide applications; carbon black (e.g., ink and pigment dispersant); dye manufacture; asphalt emulsions; water treatment (e.g., dispersant, scale inhibitor); lead acid batteries; leather tanning; micronutrients (e.g., metal chelating agents); industrial cleaners (e.g., dispersants for dirt, metal cleaner); ore beneficiation (e.g., lithium); metal plating; enhanced oil recovery; insulation; and others.

The present invention also pertains to methods and compositions wherein aldopentonic acid- or salt-containing compositions of the invention, as described above, are used as dispersants for noncementitious (i.e., non-hydratable) particles or particulate matter, such as metal oxides (e.g., titanium dioxide), dyes (e.g., anthraquinone dye, azo dye, aniline dye, stilbene, dye), pigments (e.g., zinc oxide, carbon black), fine silicas (e.g., silica fume, finely granulated silica), talc, clay (e.g., kaolin, bentonite), and other such particulate, particulated, or ground minerals, organic, or inorganic materials. Preferably, the dispersions are aqueous in nature. Accordingly, further exemplary compositions of the invention comprise an aqueous suspension comprising an aldopentonic acid or salt thereof operative to disperse one or more of the above-identified minerals or materials in particulate form.

The following examples are provided for illustrative purposes only and not intended to limit the scope of the present invention.

EXAMPLE 1

Lignosulfonate+Aldonic (Xylonic) Acid

Figure 3:
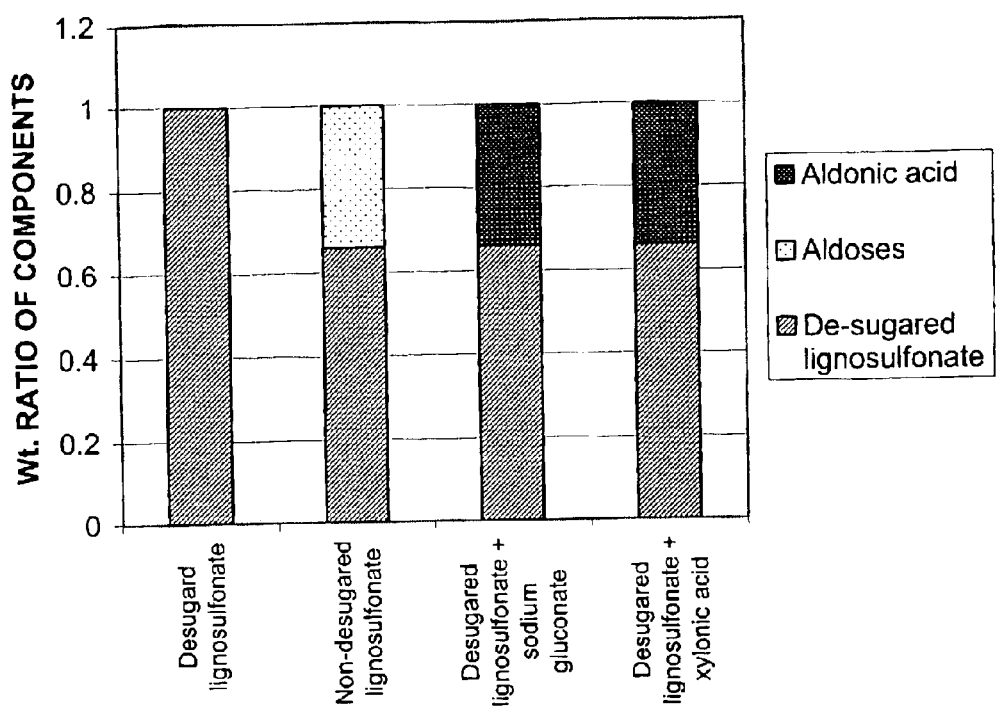
FIG. 3 is a graphic illustration of various combinations of lignosulfonates with or without sugar components.

Experiments were performed to demonstrate the benefit of converting xylose in spent sulfite liquor (SSL). Two lignosulfonate products, available from Fraser Paper, were used in the experiments. One is a lignosulfonate with sugars not removed; it contains 34% by weight xylose. The other is a lignosulfonate that was de-sugared (such that it had neglegible sugar content and could be incorporated into a cement or concrete without appreciable set retardation). The de-sugared lignosulfonate was combined with a sugar acid (gluconate or xylonic acid) at a lignosulfonate:sugar ratio of 66:34 (FIG. 3) to make a third sample for comparison with the lignosulfonate+xylose (i.e., the non-desugared) composition. Pure xylonic acid was obtained from Omicron Biochemicals, Inc.

[Mortar Testing]

Mortar flow test of the three lignosulfonate samples and lignosulfonate+gluconate was performed in accordance with JIS A 5201. The mortar mix proportion was Cement/Sand/Water=460/1350/235, water-to-cement ratio by weight (w/c)=0.51. Type I/II ordinary portland cement and standard EN-sand were used. Both mortar slump and flow were measured and the workability was determined in accordance with the formula

[workability, mm]=[slump, mm]+[flow, mm]−100.

Figure 4A:
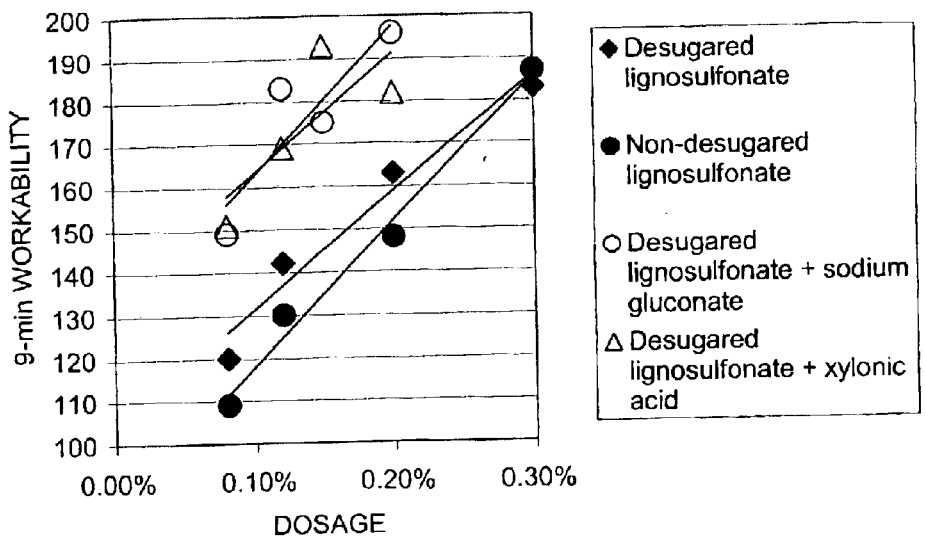
FIG. 4(a) is a graphic illustration of mortar workability characteristics of four samples of lignosulfonate compositions.
Figure 4B:
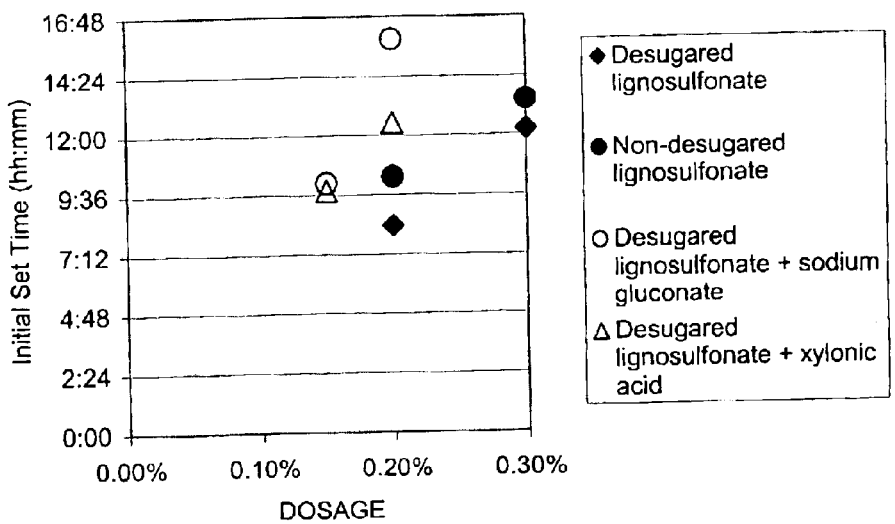
FIG. 4(b) is a graphic illustration of set time for four different lignosulfonate compositions in a cementitious mixture.

The workability for the de-sugared lignosulfonate, non-desugared lignosulfonate, de-sugared lignosulfonate+gluconate, and de-sugared lignosulfonate+xylonic acid for different dosages are shown in FIG. 4. The combination of the lignosulfonate with xylonic acid had a fluidizing effect that was greater than the lignosulfonate with xylose, as shown in FIG. 4, thus demonstrating that the lignosulfonate was greatly beneficiated by the xylonic acid and was more effective as a water reducing additive for cementitious materials.

[Concrete Testing]

The lignosulfonate samples were also tested in concrete in accordance with ASTM C 192 (Standard Practice for Making and Curing Concrete Test Specimens in the Laboratory), ASTM C 143 (Standard Test Method for Slump of Hydraulic-Cement Concrete), and ASTM C 39 (Test Method for Compressive Strength of Cylindrical Concrete Specimens). The properties of interest in the testing were 9-minute slump, water-reduction, air content of the fresh concrete, initial set-time, and compressive strength.

Two cements sourced from different geographic locations were used in the concrete testing and will be designated as 'Cement A' and 'Cement B'. The cement factor (amount per cubic yard of concrete made) used for both cements was 564 lbs/yd³-concrete. The w/c ratios of the reference concretes were 0.546 and 0.541 for Cement A and Cement B, respectively, with a target slump of 152 mm (6 inches) at 9 minutes (using the standard slump cone method as described in ASTM C 143). The water-to-cement ratio to achieve the same slump level of the concrete having a typical lignosulfonate at the dosage of 0.2% solids on cement admixed into the concrete were found to be 0.532 and 0.502 for Cement A and Cement B (i.e., a 3.6% and 7% water-reduction from the reference concretes, respectively).

Table 1 sets forth the concrete testing results involving the lignosulfonate samples as described above. The mixture containing the de-sugared lignosulfonate+xylonic acid required a dosage that was 30–45% less than lignosulfonate alone to obtain the same slump with shorter setting time. The observed superior 2-day strength of the xylonic acid mixture is likely due to shorter set-time. In cementitious systems, longer set times typically yield higher 28-day strength; however, the xylonic acid mixture also demonstrated superior compressive strengths for 28-day strength in spite of it having shorter initial set-time. All the results confirmed that the water reducing ability of the lignosulfonates was beneficiated by xylonic acid.

TABLE 1

|  | DOSE (% s/s) | SLUMP (mm) | AIR (%) | Initial Set time (hh:mm) | 2-day strength (MPa) | 7-day strength (MPa) | 28-day strength (MPa) |
|---|---|---|---|---|---|---|---|
| Cement A |  |  |  |  |  |  |  |
| Reference | — | 133 | 1.8 | 6:09 | 19.6 | 33.8 | 41.2 |
| De-sugared lignosulfonate | 0.2 | 140 | 2.2 | 10:42 | 18.5 | 34.6 | 43.2 |
| Non-de-sugared lignosulfonate | 0.2 | 121 | 2.2 | 13:28 | 15.6 | 35.8 | 41.3 |
| De-sugared lignosulfonate + xylonic acid | 0.14 | 159 | 2.3 | 10:19 | 19.2 | 35.7 | 44.5 |
| Cement B |  |  |  |  |  |  |  |
| Reference | — | 172 | 2.4 | 5:35 | 16.6 | 25.6 | 32.5 |
| De-sugared lignosulfonate | 0.2 | 159 | 2.4 | 9:15 | 20.2 | 34.7 | 44.2 |
| Non-desugared lignosulfonate | 0.2 | 159 | 2 | 11:29 | 20.8 | 37.4 | 47.0 |
| De-sugared lignosulfonate + xylonic acid | 0.11 | 165 | 2 | 8:04 | 21.1 | 34.3 | 42.1 |

EXAMPLE 2

Xylonic Acid Calorimetry

Xylonic acid was tested in a cement heat calorimeter to study its setting time behavior. The initial set time was determined by the onset of the heat peak. Two cements were used for this calorimetric testing, herein referred to as "Cement B" and "Cement C." Cement B had a lower soluble alkali content than Cement C.

Figure 5:
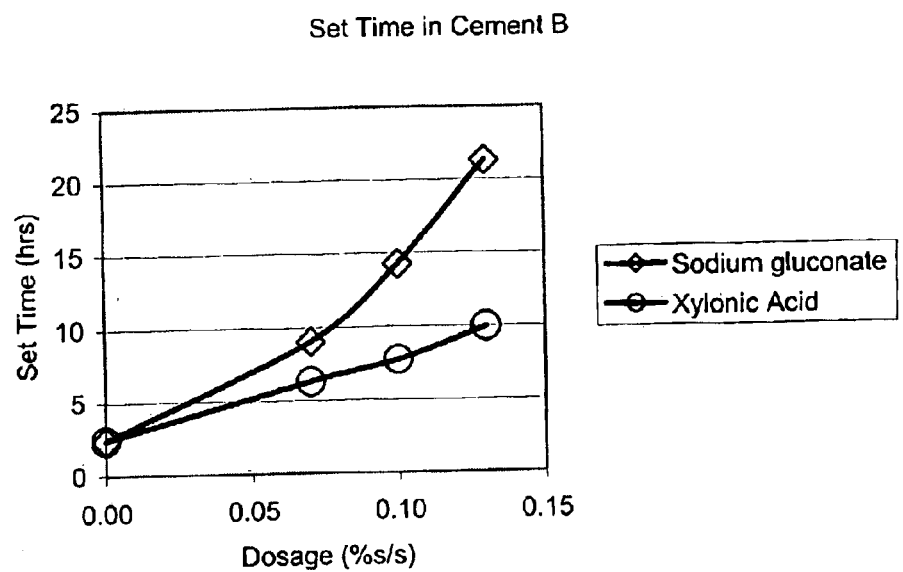
FIGS. 5 and 6 are graphic illustrations of set time for various dosages of sodium gluconate and xylonic acid in different cementitious mixes.
Figure 6:
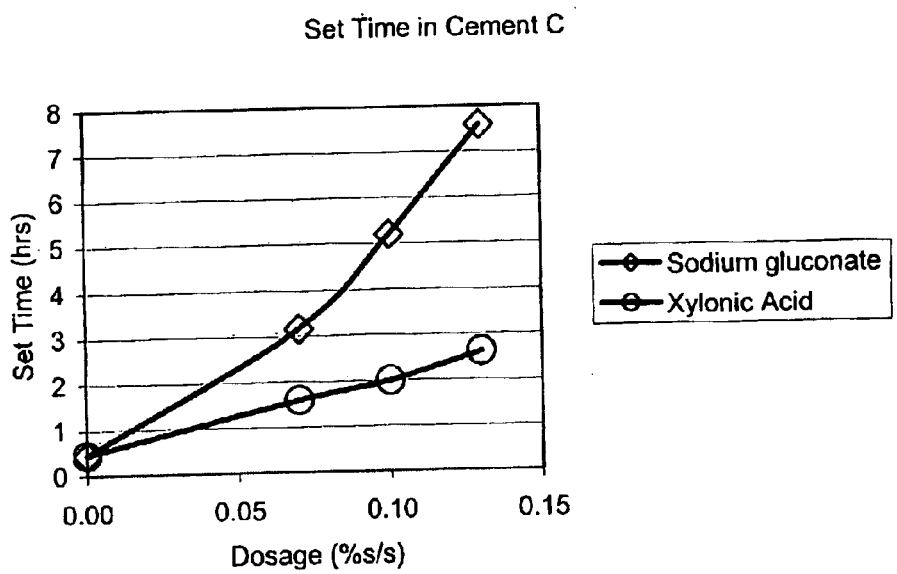

FIGS. 5 and 6 show the initial setting time results for xylonic acid and gluconate in Cement B and Cement C, respectively. The results demonstrate that xylonic acid has linear set retardation response to its dosage, in contrast to sodium gluconate. The inventors therefore believe that the retardation characteristic of xylonic acid is beneficial, in that it can be used to obtain predictable retardation behavior with dosage as compared to gluconic acid/gluconate in cementitious systems.

EXAMPLE 3

Xylonic Acid Produced via Enzyme Process

D-xylose was oxidized to D-xylonic acid using enzymes to demonstrate feasibility of enzymatic conversion and to investigate the water reducing capabilities of a solution bearing the resulting conversion product. The enzymes used for conversion were glucose oxidase (E.C. 1.1.3.4) from *Aspergillus niger* and catalase (E.C. 1.11.1.6), both of which are available from Genencor International under the tradenames OxyGo 1500 and Fermcolase 1000, respectively.

In a 500-mL jacketed reaction flask, 50 grams D-xylose (from Sigma-Aldrich Chemicals) was dissolved into 525 grams distilled water to make an 8% sugar solution. The solution was stirred continuously at 350 rpm. The jacketed reaction vessel was connected to a circulating water bath kept at 55° C. Upon xylose dissolution and temperature stabilization 0.052 gram OxyGo per gram dissolved solids (approx. 68 GOU/gram dissolved solid xylose) and 0.015–0.032 gram Fermcolase per gram dissolved solids (approx. 2000–4000 CU/gram dissolved solid xylose) were added. Air was used as the oxygen source and was bubbled into the broth at a rate of 3 standard cubic feet per hour (scfh).

The reaction was kept at pH 5.2 by the addition of 0.5M NaOH throughout the reaction. The NaOH consumption was used to measure progression of the reaction. Additional enzyme was added at 0.052 gram OxyGo per gram dissolved solids and 0.015–0.032 gram Fermcolase per gram dissolved solids every 3–5 days of the reaction. The reaction was halted when the amount of NaOH consumed corresponded to 90% conversion of xylose sugar to xylonic acid.

The ion chromatography analysis showed that the product contains 5.5–9.3% (on dry weight of the product) of chloride which was originated from the enzymes used.

[Concrete Testing]

The xylonic acid prepared above was tested in concrete as in example 1 according to ASTM C 192 and ASTM C 143. The 9-min slump values and initial set times in concrete of the xylonic acid alone were compared with those of the de-sugared lignosulfonate, sodium gluconate alone, and D-xylose (the starting material) alone. Cement A was used with a cement factor of 564 lbs/yd$^3$-concrete and the water-to-cement ratio was 0.567. Various dosages of each sample were tested.

Figure 7:
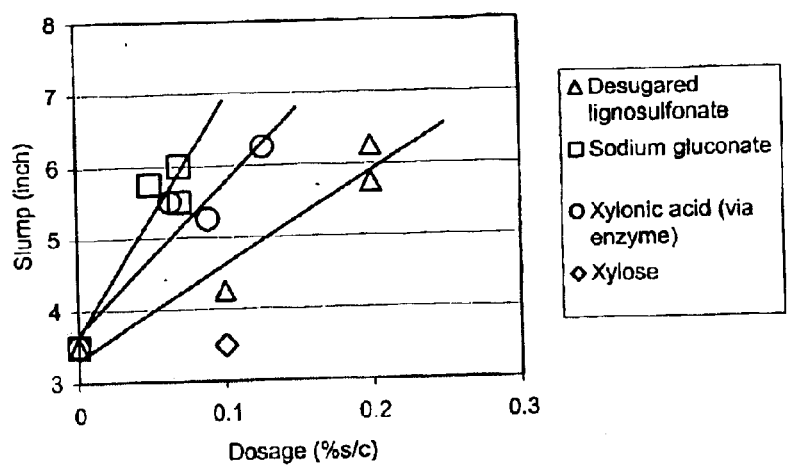
FIG. 7 is a graphic illustration of slump for different water reducing additives at various dosages.
Figure 8:
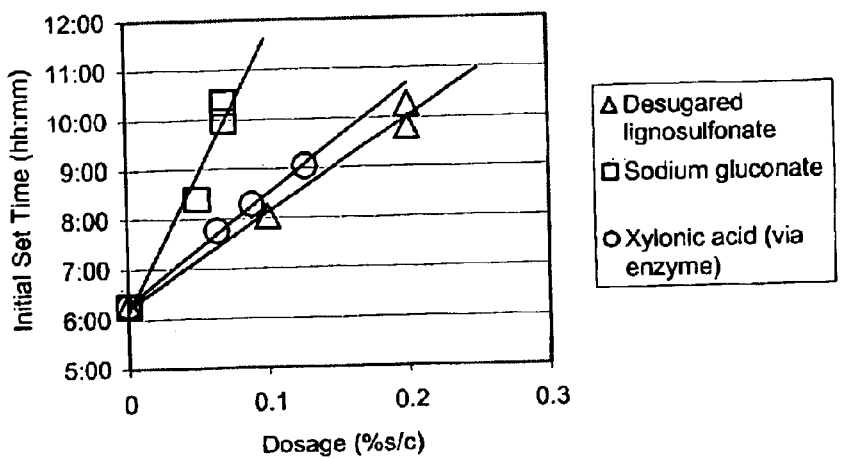
FIG. 8 is a graphic illustration of set time for various dosages of water reducing additives.

FIGS. 7 and 8 show the results for slump and set time, respectively. As shown in FIG. 7, xylonic acid performed significantly better in slump for a given dosage than de-sugared lignosulfonate, and almost nearly as well as sodium gluconate alone. FIG. 8 shows that xylonic acid has a significantly shorter set time than gluconate and a similar set time performance compared to de-sugared lignosulfonate. It should be noted, however, that a part of set-time reduction was likely due to the presence of chloride in this particular sample. The present inventors note that the xylonic acid was nearly twice as effective as de-sugared lignosulfonate, as only about half the amount of the xylonic acid was needed to obtain a similar slump in fresh concrete when compared to the de-sugared lignosulfonate. Considering the results of this example with those of example 2, the present inventors believe that xylonic acid, with its linear set retardation response within the practical dosage range and its concrete-plasticizing capability, provides a surprisingly beneficial water reducing ability.

EXAMPLE 4

Xylose Conversion by *Gluconobacter Oxydans*, ATCC 621, in SSL

D-xylose in hardwood spent sulfite liquor (SSL) was bio-converted to D-xylonic acid using a microorganism to demonstrate feasibility of microbial conversion with the presence of lignosulfonate. The microorganism used for conversion was *Gluconobacter Oxydans* suboxidans (ATCC 621). The SSL substrate used was non-desugared lignosulfonate from Fraser Paper described in Example 1.

[Bio-Conversion]

Figure 9:
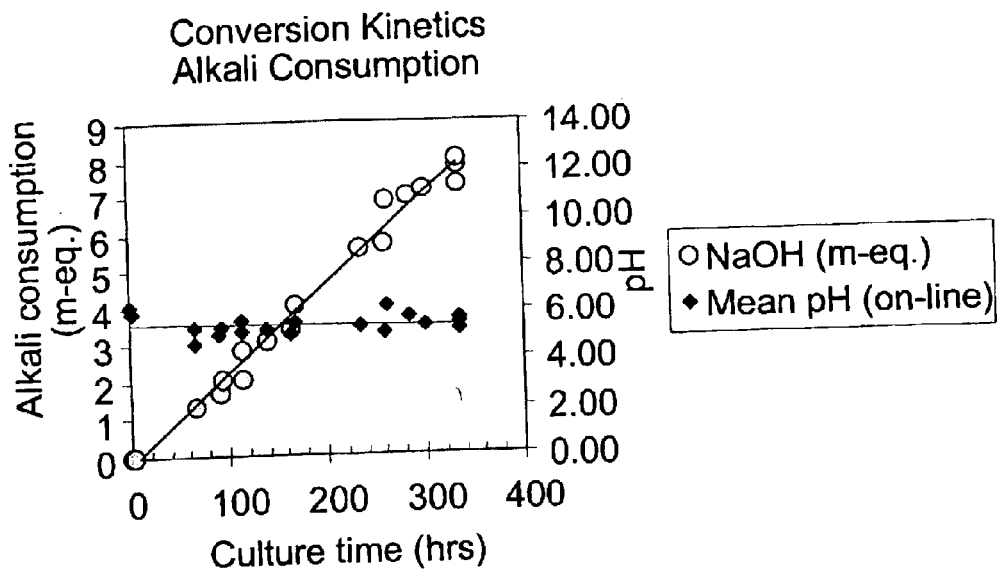
FIG. 9 is a graphic illustration of alkaline consumption during the microbial bioconversion of non-desugared SSL.
Figure 10:
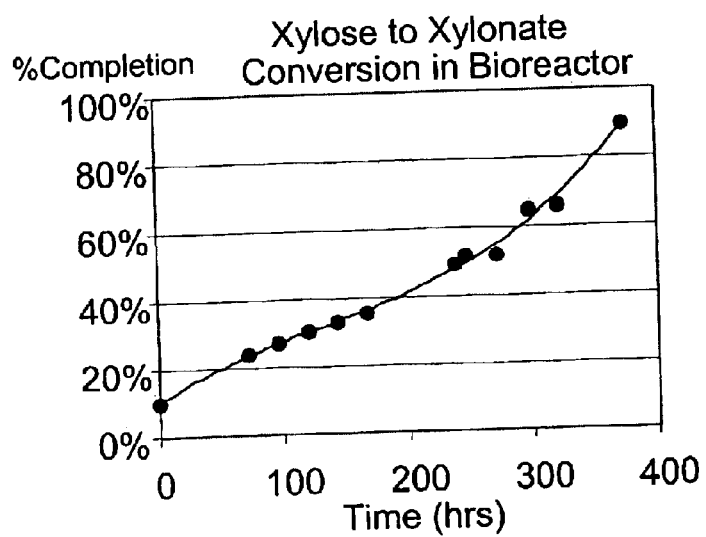
FIG. 10 is a graphic illustration of the xylose to xylonic acid conversion progress during the microbial bioconversion of non-desugared SSL determined by HPLC.

The bio-conversion of SSL was performed according to the following procedure based on the literature (Buchert, J., "Biotechnical Oxidation of D-xylose and Hemicellulose Hydrolyzates by *Gluconobacter Oxydans*," Technical Research Centre of Finland, Publications 70 (Espoo, November 1990), pp. 17–20). The inoculum of *G. oxydans* was prepared with the basal medium described in the above literature. A 50 mL of basal media containing xylose and glucose (xylose:glucose=20:1 g/L) in each 250 mL flask was inoculated with *G. oxydans* (viable counts=$10^5$ cfu) and incubate at 25 degC. on a shaker table (200 rpm). Within 5 days, the pH of the culture media dropped to 3 and the viable counts increased to over $10^7$ cfu. Total 100 mL of the culture media was then spun down to 1 mL. Thus prepared inoculum was added to a 100 mL of the sterile hardwood SSL (5 wt. %) with basal media except xylose and glucose. The bio-converison was done in a sterilized bio-reactor (500 mL scale) equipped with a mechanical stirrer, filtered air bubbling tube and pH controller. The pH was maintained at 5.5 using a NaOH solution. The conversion was monitored by the consumption of NaOH and HPLC. The progress of the conversion are shown in FIG. 9 (NaOH consumption) and FIG. 10 (HPLC).

It was also demonstrated that the conversion rate can be significantly improved by simply adding more *G. Oxydans* in the bio-reactor.

[Mortar Testing]

Figure 11:
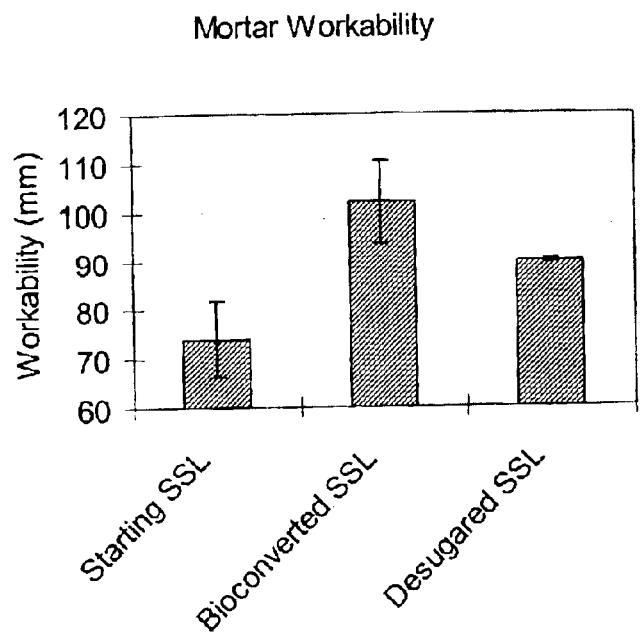
FIG. 11 is a graphic illustration of mortar testing workability results of the bioconverted SSL.
Figure 12:
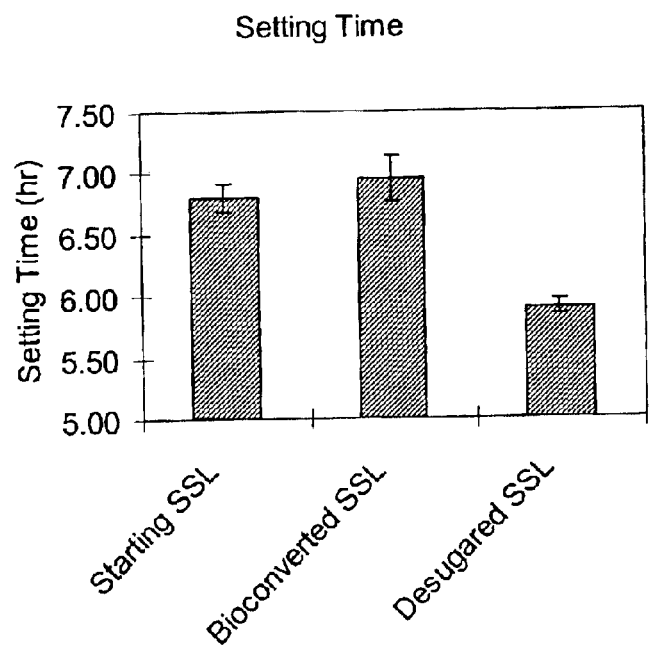
FIG. 12 is a graphic illustration of mortar testing set time results of the bioconverted SSL.

The obtained bio-converted SSL was tested in mortar as described in Example 1. The mortar mix proportion was Cement/Sand/Water=384/1350/230. The dosage used was 0.1 wt. % of solid on the weight of cement. FIG. 11 and FIG. 12 shows the workability and Setting time results, respectively. As shown in the figures, the workability of starting non-desugared SSL was significantly improved by the bioconversion. Setting time is similar to the starting SSL, but longer than a desugared SSL.

However, higher workability of the bioconverted SSL allows less to be used, and consequently the set-time effect should be equivalent to that of the desugared SSL.

[Paste Testing]

Figure 13:
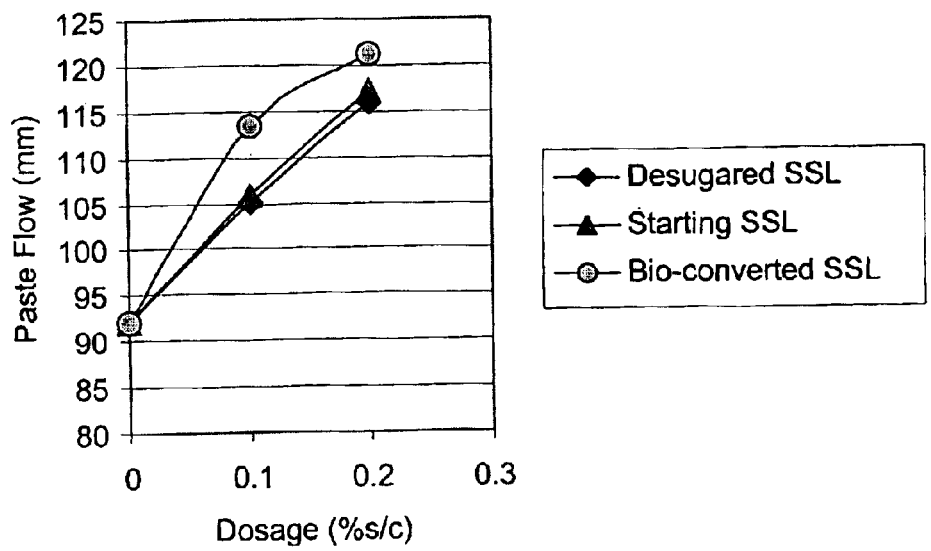
FIG. 13 is a graphic illustration of cement paste test flowability results of the bioconverted SSL.
Figure 14:
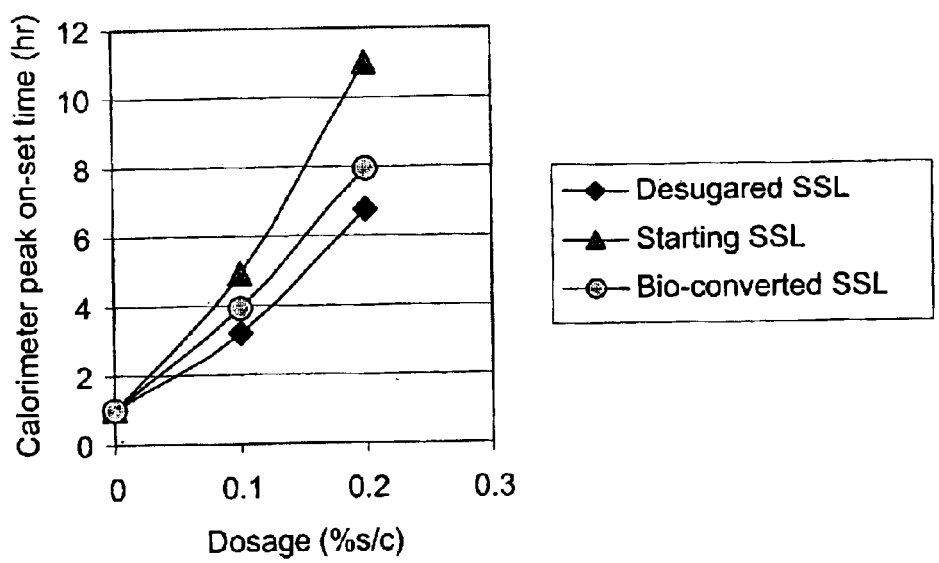
FIG. 14 is a graphic illustration of cement paste test calorimetric setting time results of the bioconverted SSL.

The bio-converted SSL was also tested against starting SSL and desugared SSL in the cement paste. The cement paste test was performed with the w/c ratio of 0.5. Delayed addition of chemicals was employed. The paste test procedure is described elsewhere (e.g. B.-w. Chun, Cement and Concrete Research, 31 (2001) 959–963). FIG. 13 and FIG. 14 show the cement paste flow data and calorimetric setting time data respectively. As shown in FIG. 13, the bio-converted sample shows superior flowability. According to the result, the required dosage of the bio-convereted SSL to achieve the same workability is substantially less than the starting SSL and desugared SSL. The setting time of the bio-converted SSL should be equivalent or even less than the desugared SSL at the dosages adjusted to the same workability.

EXAMPLE 5

The inventors discovered a synergistic behavior in set time behavior when xylonic acid or its salt was combined in mortar with an alkanolamine, such as triethanolamine (TEA) or a diethanolisopropanolamine such as N,N-bis(2-hydroxyethyl)-2-propanolamine or N,N-bis(2-hydroxypropyl)-N-(hydroxyethyl)amine.

A mortar was prepared using a Type I Portland cement, sand (such that the sand to cement weight ratio was 2.935), and water (such that the water to cement ratio was 0.543). Five different samples were tested having an admixture comprising xylonic acid and/or TEA or DEIPA, wherein the amount of xylonic acid was progressively 0%, 25%, 50%, 75%, and 100%. These samples were tested for set time behavior.

Figure 15:
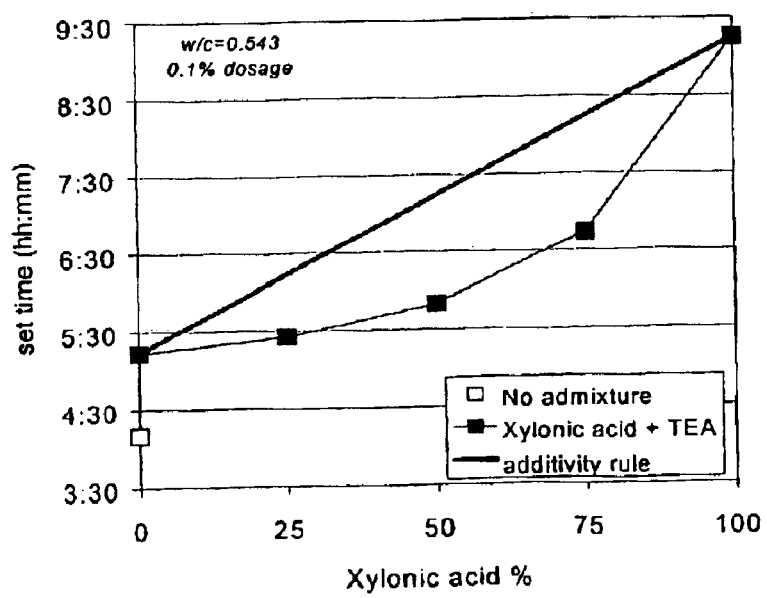
FIG. 15 is a graphic illustration of set time behavior of an exemplary composition of the invention comprising xylonic acid and triethanolamine.
Figure 16:
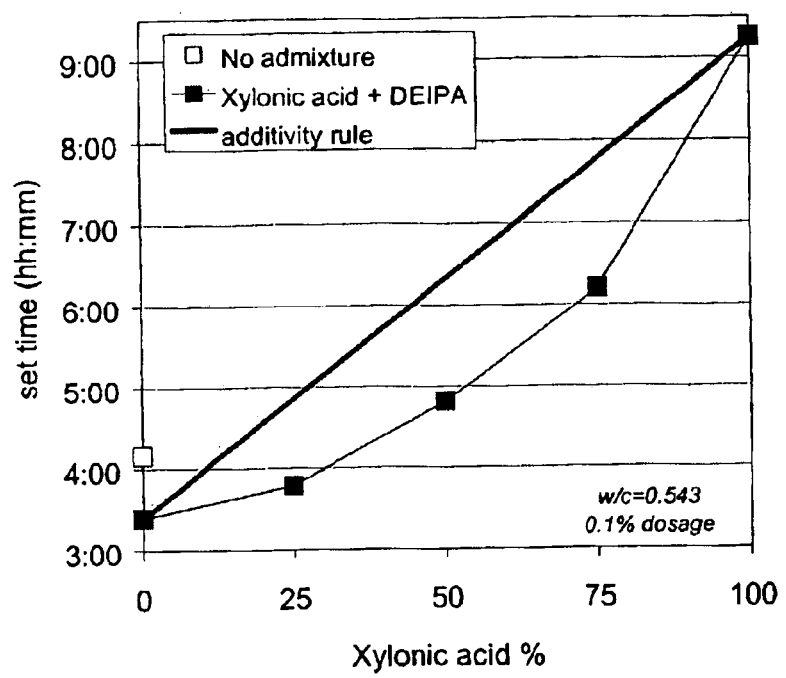
FIG. 16 is a graphic illustration of set time behavior of an exemplary composition of the invention comprising xylonic acid and diethanolisopropanolamine.

The results for xylonic acid and/or TEA are depicted in FIG. 15, while the results for xylonic acid and/or DEIPA are depicted in FIG. 16. From these figures, it can be seen that the addition of alkanolamine decreases the set time for a given xylonic acid percentage in comparison to what would typically be expected as a matter of normal additive effect.

When the workability of the various xylonic acid/alkanolamine combinations were tested at 0%, 25%, 50%, 75%, and 100% (xylonic acid), however, it was found that the behavior of workability was merely additive (ie. the workability tended to increase linearly as the percentage of xylonic acid was increased). Thus, the behavior shown in FIGS. 16 and 17 were believed to indicate highly synergistic behavior between the xylonic acid and alkanolamines in terms of set time behavior.

Hence, exemplary compositions of the invention comprise an aldopentonic acid, aldohexonic acid, their salts, or mixtures thereof, in combination with an alkanolamine, such as TEA and DEIPA.

The invention is not to be limited by the foregoing examples and preferred embodiments, which are provided for purposes of illustration only.

It is claimed:

1. A composition, comprising: (A) a first component selected from the group consisting of a lignosulfonic acid or salt thereof and a gluconic acid or salt thereof in an amount no less than 5% and no greater than 90% based on dry weight solids in the composition; and (B) a second component comprising xylonic acid or salt thereof in an amount no less than 10% and no greater than 95% based on dry weight solids in the composition.

2. The composition of claim 1 further comprising an alcohol selected from the group consisting of methanol and ethanol, said alcohol being present in an amount no less than 0.01%, and said alcohol being present in an amount no greater than 5.0%, said percentages being based on dry weight solids in the composition.

3. The composition of claim 1 further comprising cellulose fibers being present in an amount no less than 0.01%, and said cellulose fibers being present in an amount no greater than 5.0%, said percentages being based on dry weight solids in the composition.

4. The composition of claim 1 further comprising arabinonic acid or salt thereof.

5. The composition of claim 1 wherein xylonic acid is present in the amount of at least 30% based on dry weight solids in the composition.

6. The composition of claim 1 wherein said xylonic acid is present in the amount of at least 50% wt. based on dry weight solids in the composition.

7. The composition of claim 4 wherein the amount of said xylonic acid or salt thereof exceeds that of said arabinonic acid or salt thereof.

8. The composition of claim 7 wherein said arabinonic acid or salt thereof is in an amount that is no greater than 30% by weight of total composition.

9. The composition of claim 1 comprising a gluconic acid or salt thereof.

10. The composition of claim 9 further comprising a mannonic acid, galactonic acid, or salt thereof or mixture thereof.

11. The composition of claim 9 having an aldopentonic acid or salt content in an amount no less than 0.1%, and in an amount no greater than 40% based on dry weight solids in the composition.

12. The composition of claim 1 further comprising a plurality of hydratable particles or non-hydratable particles.

13. The composition of claim 1 further comprising at least one other additive or admixture.

14. The composition of claim 13 said additive or admixture is an alkanolamine.

15. The composition of claim 14 wherein said alkanolamine is selected from the group consisting of triethanolamine, a diethanolamine, a diethanolisopropanolamine, a triisopropanolamine, and mixtures thereof.

16. The composition of claim 15 wherein said alkanolamine is N,N-bis(2-hydroxyethyl)-2-propanolamine or N,N-bis(2-hydroxypropyl)-N-(hydroxyethyl)amine.

17. The composition of claim 14 wherein the ratio of said xylonic acid or salt thereof to said alkanolamine is not less than 1:1 and not greater than 100:1.

18. The composition of claim 17 wherein said ratio of said xylonic acid or salt thereof to said alkanolamine is 2-10:1.

19. The composition of claim 13 further comprising an additive selected from the group consisting of molasses, melamine sulfonate formaldehyde polymer, naphthalene sulfonate formaldehyde polymer, ammonium, alkali, alkaline earth, trivalent, or transition metal chloride and bromide, protein, alkanolamine, tall oil fatty acid, fatty acid or derivative thereof, fatty ester or derivative thereof, ammonium, alkali, alkaline earth, trivalent, and transition metal salts of hydroxycarboxylic acids including gluconic acid, glucoheptonic acid, citric acid, tartaric acid, mucic acid, malic acid, and salicylic acid, salts of lignosulfonic acid, dyes, sucrose, glucose, corn syrup, sodium sarcosinate, alcohol, phenol, acetic acid, sodium hydroxide, potassium hydroxide, sodium linear alkylate sulfonate, formaldehyde, silica, polymers containing oxyalkylene groups, calcium formate, formic acid, siloxane, a surfactant, resin and rosin acids, polyacrylic acid, polyvinyl pyrrolidone, ammonium, alkali, alkaline earth, trivalent, and transition metal salts of aluminate, silicate, carbonate, borate, phosphonate, lactate, sulfate, thiosulfate, benzoate, acetate, oxalate, ferricyanide, and succinate, glycols, borate ester, phosphonate ester, phosphate ester, phenol and derivative thereof, a natural gum, and a starch.

20. The composition of claim 13 wherein said composition comprises an admixture selected from the group consisting of an accelerator, retarder, air detrainer, air entrainer, alkali-reactivity reducer, bonding admixture, water-reducing admixture, superplasticizer, colorant, corrosion inhibitor, damp proofing admixture, gas forming agent, permeability reducer, pumping aid, fungicidal admixture, germicidal admixture, insecticidal admixture, waterproofing agents, finishing aids, anti-freeze agents, viscosity modifying agents, shrinkage reducing agents, shrinkage-compensating agents, strength enhancing agents, anti-efflorescence agents, expansive agents, and de-icing agent, and mixtures thereof.

21. The composition of claim 13 further comprising at least one additive or admixture having at least one oxyalkylene group.

* * * * *